(12) United States Patent
Fouchier (10) Patent No.: US 7,240,428 B2
(45) Date of Patent: Jul. 10, 2007

(54) METHOD FOR MAKING PROBES FOR ATOMIC FORCE MICROSCOPY

(75) Inventor: Marc Fouchier, Leuven (BE)

(73) Assignee: Interuniversitair Microelektronica Centrum vzw (IMEC), Leuven (BE)

(*) Notice: Subject to any disclaimer, the term of this patent is extended or adjusted under 35 U.S.C. 154(b) by 0 days.

(21) Appl. No.: 11/015,715

(22) Filed: Dec. 16, 2004

(65) Prior Publication Data

US 2005/0146046 A1 Jul. 7, 2005

(30) Foreign Application Priority Data

Dec. 17, 2003 (EP) ................... 03447294

(51) Int. Cl.
*H01R 9/00* (2006.01)
*H05K 3/00* (2006.01)

(52) U.S. Cl. ............ 29/844; 29/25.35; 29/825; 29/829; 29/846; 29/874; 73/105; 257/253; 257/254

(58) Field of Classification Search .......... 29/844, 29/25.35, 825, 829, 846, 874; 73/105; 257/253, 257/254

See application file for complete search history.

(56) References Cited

U.S. PATENT DOCUMENTS

| | | | | |
|---|---|---|---|---|
| 4,423,401 | A | * | 12/1983 | Mueller ............ 337/107 |
| 4,958,585 | A | | 9/1990 | Caldwell, Jr. |
| 5,272,913 | A | * | 12/1993 | Toda et al. ........... 73/105 |
| 5,399,232 | A | | 3/1995 | Albrecht et al. |
| 6,215,137 | B1 | | 4/2001 | Suzuki et al. |

FOREIGN PATENT DOCUMENTS

| | | |
|---|---|---|
| EP | 1189016 A | 3/2002 |
| EP | 1202047 A | 5/2002 |
| WO | WO 94/18697 A | 8/2004 |

OTHER PUBLICATIONS

PH. Niedermann, et al., CVD Diamond Probes for Nanotechnology, Applied Physics A: Materials Science & Processing, 1998, S31-S34, 66.
European Search Report for Application No. EP 03447294, Jun. 2, 2004.
Mihalcea, et al., Fabrication of monolithic diamond probes for scanning probe microscopy applications, Appl. Phys. A, 66, S87-S90, 1998.
Hanni, et al., Selective area deposition of diamond on 4 in Si wafers, Thin Solid Films, 236, pp. 87-90, 1993.

* cited by examiner

*Primary Examiner*—A. Dexter Tugbang
*Assistant Examiner*—Tim Phan
(74) *Attorney, Agent, or Firm*—Knobbe Martens Olson & Bear, LLP (57) ABSTRACT

A method for producing probes for atomic force microscopy comprises producing, on a surface of one side of a semiconductor substrate, one or more moulds for the production of one or more probe tips. One or more probe configurations and at least one set of a probe tip and a cantilever are also produced on the side of the substrate, wherein each configuration comprises a contact region for attachment of a holder. The surface area of each contact region is smaller in size than the surface area of the holder. The method further includes attaching one or more holders to the contact region(s), and releasing the probe configuration and the holder from the substrate by under-etching the probe configuration from the side of the substrate on which the probe configuration is produced.

11 Claims, 7 Drawing Sheets

METHOD FOR MAKING PROBES FOR ATOMIC FORCE MICROSCOPY

FIELD OF THE INVENTION

The present invention is related to probes for Atomic Force Microscopy (AFM). Such a probe consists of a probe tip, a cantilever and a probe holder chip. The invention is related to a method for manufacturing a probe of this type.

DESCRIPTION OF RELATED TECHNOLOGY

Atomic Force Microscopy is a well established surface analysis technique for analysing the topography and electrical characteristics of semiconductor samples. The technique involves the use of a moving probe in contact with the surface under analysis. An AFM probe generally consists of a cantilever, a tip at one end of the cantilever and a holder at the other end. The holder is a large body of material used to handle the probe and is preferably located at the opposite side of the probe tip, i.e. at the side pointing in the opposite direction of the tip, this to prevent the holder from touching the sample's surface.

Document U.S. Pat. No. 4,958,585 discloses a first type of probe, having a silicon tip, manufactured by Si bulk micromachining.

The kind of probe to which the invention is related has a tip that is moulded into a silicon substrate. This is illustrated for example in document U.S. Pat. No. 5,399,232. Of this type, probes with silicon nitride tip and cantilever are the most common. In all cases of this kind, the tip is pointing inwards towards the substrate. The holder can be attached by anodic bonding, or by adhesive, eutectic or solder bonding. It can be formed above the wafer by plating or out of thick resist. Often, a full glass wafer is bonded and then diced on the substrate to form individual holders.

In any event, when making a probe with a moulded tip, it is necessary to release the probe from the substrate. The best known way to do this is to etch back all or a part of the silicon substrate from the back side, as described in U.S. Pat. No. 5,399,232. However, this approach suffers from a number of disadvantages, most important of which are the long release time and the important loss of material by etching the entire thickness of the substrate.

Another technique involves the peeling off of the probe, followed by the attachment of the holder, such as disclosed for example in EP-A-1202047. This is however a slow manual process. Also, inherent to the difficult process of bonding a holder to the probe after peel-off, the risk of breaking the probe is important. Finally, when applying this process, the holders must be attached one by one. Dicing a substrate above a number of peeled-off probes is not possible, because of the mechanical stress that would be applied to the holder-substrate, and the subsequent risk of damage to the probes.

In the already cited EP-A-1202047, the probe tip and cantilever are underetched prior to peel-off, but the rest of the probe structure, particularly the part on which the holder is to be attached is too large to be fully underetched. This has also made it impossible so far to release the probe from the front side after bonding or forming of a holder. No sacrificial layer has been found to be really practical for release under a 1.5×3 mm holder piece. Either the etch rate is too slow or the release chemical is overly harmful to the probe. Underetching the Si wafer under the probe is not an option either, since Si is etched slowly in KOH or another anisotropic etchant. Even when the probe is oriented along the fast underetched <100> direction, which is normally not the case, such an underetch would be slow and it is probable that the substrate is etched through before the underetch is complete. In order to reduce the underetching time of a sacrificial layer, it is known to produce small holes in the microfabricated structure to be released. However, this has so far not been done for a complete AFM probe, including the attached holder.

Another example of top side release of a probe before holder attachment, in this case a diamond probe is to be found in 'CVD diamond probes for nanotechnology', Niedermann et al., Appl. Phys. A66, S31–S34 (1998). In this case, the film comprising the cantilever forms a pattern that is mostly in the <100> direction although the probe including the cantilever is still oriented in the general <110> direction. An example of front side release of patterned microstructures by underetching the Si substrate in isotropic etchant can be found in WO-A-9418697. In this case the pattern does not need to be rotated in the <100> direction.

The invention aims to provide a method for producing probes with a moulded tip, which does not suffer from the disadvantages of the prior art.

DETAILED DESCRIPTION OF CERTAIN INVENTIVE EMBODIMENTS

One embodiment of a method comprises the following:
providing a semiconductor substrate, preferably a Si substrate,
producing on the surface on one side of the substrate, one or more moulds in the substrate. A mould is preferably a pyramidal pit, produced for example by the use of a hard mask, and an anisotropic etch, usually in KOH,
optionally, applying a tip material, for example a metal, a hardmetal, a metal oxide, a ceramic or diamond. This is done when the tip material is different from the cantilever material.
optionally, patterning the tip material. In some cases, the patterning can be done prior to the tip material deposition. In this case, a material is deposited and patterned. The tip material is then deposited selectively, See C. Mihalcea et Al, Appl. Phys. A 66, S87–S90 or W. Hanni et Al, Thin Solid Films 236, 87–90 (1993).
Creating a probe configuration on the surface at the side of the mould, comprising a contact region for attachment of a holder, and at least one set of a probe tip and a cantilever. Different ways of creating such a probe configuration can be applied, as described further in this description. More than one probe configuration may be created simultaneously.
attaching a holder to the contact region(s).

In one embodiment, the surface area of the contact region is smaller in size than the surface area of the holder region which is to be attached to the contact region. The probe configuration is then under-etched from the front side of the substrate, i.e. the side on which the probe configuration is made, after the step of attaching a holder. The under-etch is followed by the removal of the structure consisting of the holder and the probe configuration, attached to the holder. The advantage of underetching from the side carrying the probe configuration and to which a holder is attached (frontside surface) is evident with respect to the prior art applications where the etching takes place from the opposite (back) side: the etching step takes place quicker and with less loss of material. At the same time, due to the contact region being smaller than the holder region, the underetch can take place without the difficulties in prior art applications, where a large area had to be underetched. An additional advantage of having the holder attached prior to the underetching of the probe configuration is that the probe configuration can be better manipulated during and after the release step thanks to the presence of this holder.

According to one embodiment, the probe configuration is made in such a way that the contact region consists of one or more separate, elevated bonding pads, the total surface of these pads being smaller than the surface area of the holder region which is to be attached to these pads. The holder is then attached to these pads, by a known technique, for example bonding or soldering.

After this, the probe and holder are separated from the substrate by underetching with a release chemical from the front side of the substrate. The contact region can be fully underetched due to the reduced size of this contact region. The height of the pads is sufficient to allow the release chemical to flow underneath the attached holder, into a gap formed between the holder and the substrate. The difference in size between the contact region and the holder is sufficient in order to allow the creation of the gap over a large area of the substrate surface which is covered by the holder. In one specific embodiment, the pads are only surrounded by a gutter, and the gap is formed by the thickness of a bonding layer attached to the pads (see FIG. 2A–C).

Optionally, a sacrificial layer may be applied before creating the probe configuration. Such a sacrificial layer will facilitate the release.

Figure 1A:
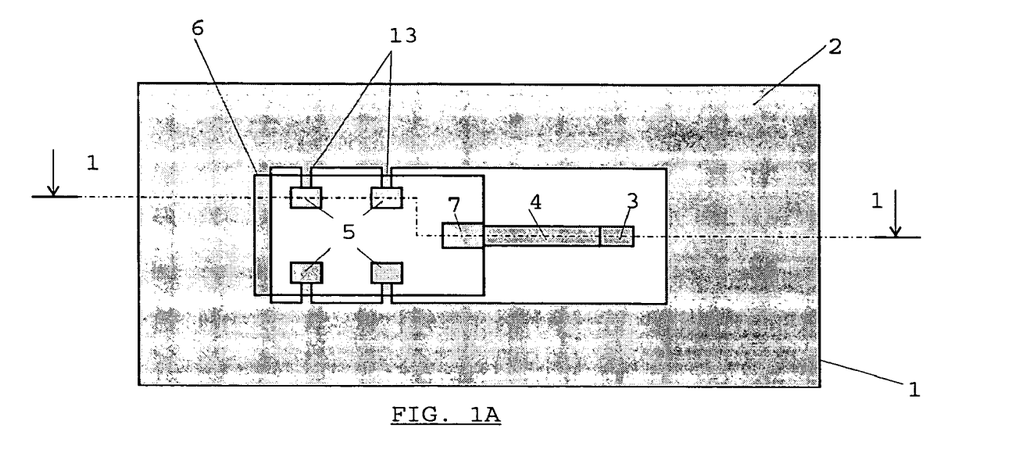
FIG. 1A represents in top view one embodiment of a probe configuration used in a method of the invention.

FIG. 1A illustrates one embodiment of the invention. It shows a top view of the substrate 1 wherein the probe configuration is equally visible. This configuration comprises the probe tip 3 (possibly made of a different material than the probe layer), the cantilever 4 and the contact region, comprising four bonding pads 5. The large rectangle indicates the place where the holder 6 will be placed. The part 7 of the cantilever which is to be covered by the holder, can be viewed as a fifth bonding pad. The bonding pads 5 and 7 thereby define the contact region. In this embodiment, the probe configuration is produced by applying a probe layer 2, and subsequently patterning this layer.

Figure 1B:
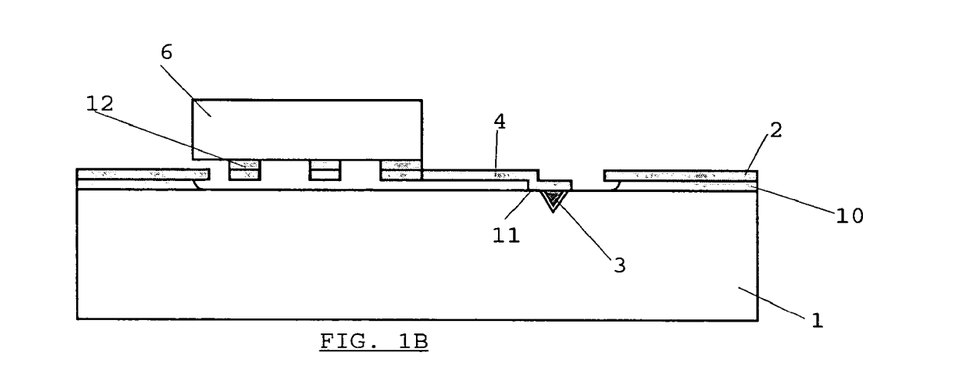
FIG. 1B represents a sectioned view of the probe configuration of FIG. 1A with a sacrificial layer, taken along line 1—1 of FIG. 1A.

FIG. 1B shows a first embodiment wherein a sacrificial layer 10 is applied before applying the probe layer 2. It is to be noted that the sacrificial layer is patterned prior to the application of the probe layer, so that a small area 11 around the tip is not covered by the sacrificial layer.

Then the probe layer 2 is applied on top of the sacrificial layer and subsequently patterned to obtain the bonding pads 5, 7 and the cantilever 4, lying on top of the sacrificial layer 10. The patterning of the probe layer takes place in a known way, by applying resist and performing a lithography step. What is obtained after this step is the probe configuration, being still attached to the substrate and consisting of the pads 5 and 7, the cantilever 4 and the tip 3.

A bonding layer 12 may be applied to the bonding pads by plating, etching back or lift-off. Alternatively, the bonding layer can itself be a photosensitive layer, patterned directly by lithography. After formation of the bonding layer 12, the holder 6 is attached to the bonding layer 12. The bonding layer can also be applied to the holder, or to the pads and the holder. Alternatively, the bonding layer may be absent, and the holder may be attached directly to the bonding pads. After that, the under-etch takes place with the help of a release chemical, which may be a liquid or gas phase, i.e. vapour HF or a plasma, and which can flow in the gap between the substrate and the holder.

The result is shown in FIG. 1B. Underneath the pads 5 and the cantilever, the sacrificial layer 10 is etched away. Under the tip 3, the substrate is etched. The underetching of the pads, cantilever and tip can take place quickly due to the reduced area of the pads, allowing the release of the whole structure in a short time, thereby avoiding the risk of damaging the probe by a prolonged contact with the release chemical. In this embodiment, the pads 5 remain attached to the probe layer 2 through strips 13, which can be broken prior to the final removal of the probe structure.

Figure 1C:
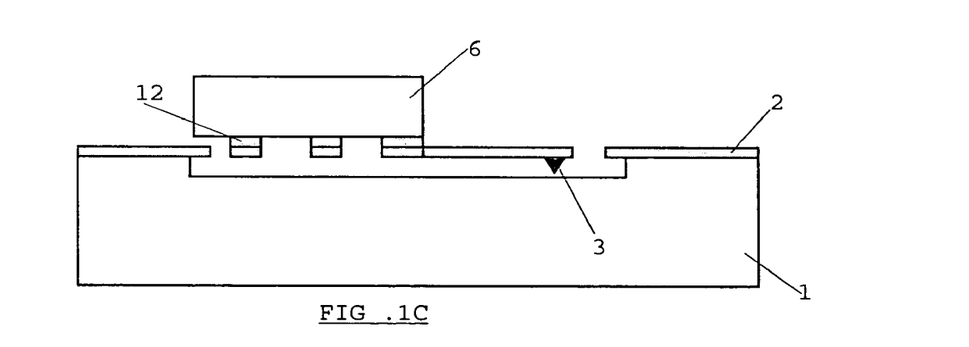
FIG. 1C represents a sectioned view of the probe configuration of FIG. 1A without a sacrificial layer, taken along line 1—1 of FIG. 1A.

FIG. 1C shows an embodiment without the use of a sacrificial layer, and wherein the substrate 1 is underetched.

Figures 2A, 2B, 2C:
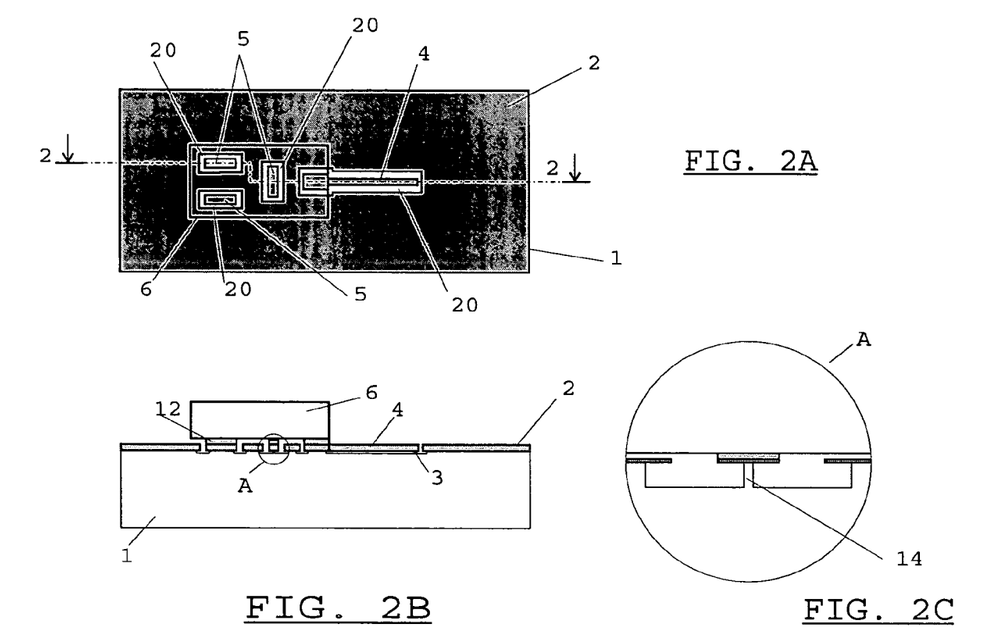
FIG. 2A represents in top view another probe configuration.
FIG. 2B represents a sectioned view of the probe configuration of FIG. 2A taken along line 2—2.
FIG. 2C is an enlarged view of area A of FIG. 2B.

FIGS. 2A–C show an embodiment, wherein the patterning of the probe layer is done in such a way that only a zone 20 around the pads 5 and the cantilever 4 is removed. In this embodiment, the bonding layer 12 provides the necessary distance between the holder 6 and the probe layer 2, allowing the release chemical to flow in the 'gutters' 20 around the bonding pads 5. The thickness of the bonding layer may therefore be a significant parameter in this embodiment. Also in the embodiment of FIGS. 2A–C, there are no strips 13 between the probe configuration and the substrate. However, such a connection is preferably obtained by not fully underetching the pads 5, as seen in the enlarged view of FIG. 2C. Small contact Si-areas 14 remain between the substrate and the probe configuration. The dimensions of the bonding pads and the etch times should be such that these contact areas are obtained. To obtain this effect, the pads are preferably much longer than wide and oriented in a <100> direction. After the under-etch, these areas 14 can be broken or the probe can be peeled off for a full removal. A similar process is possible using a sacrificial layer.

Figure 3A:
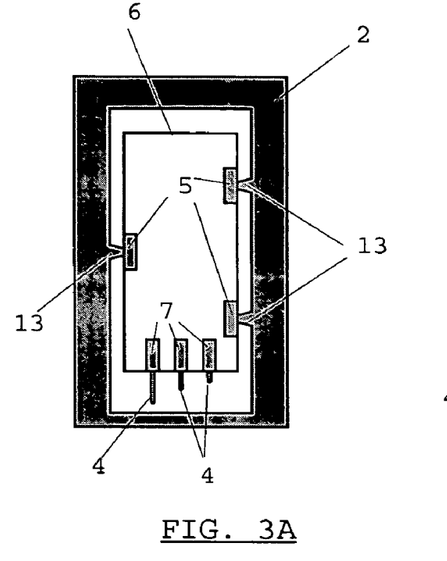
FIG. 3A represents in top view one embodiment of a probe configuration with three probe tips.
Figure 3B:
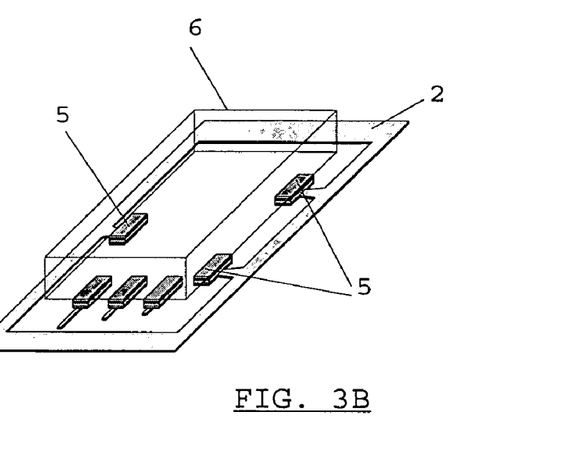
FIG. 3B represents in perspective view the probe configuration of FIG. 3A.
Figure 4A:
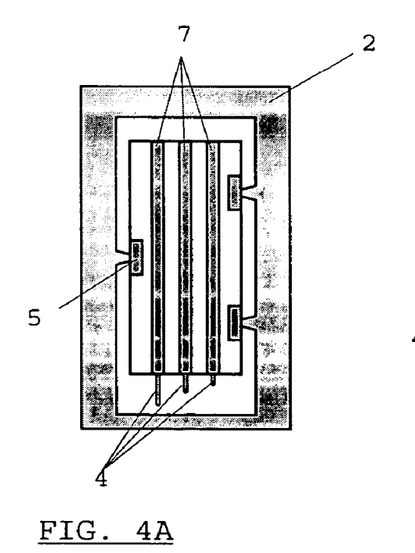
FIG. 4A represents in top view another embodiment of a probe configuration with three probe tips.
Figure 4B:
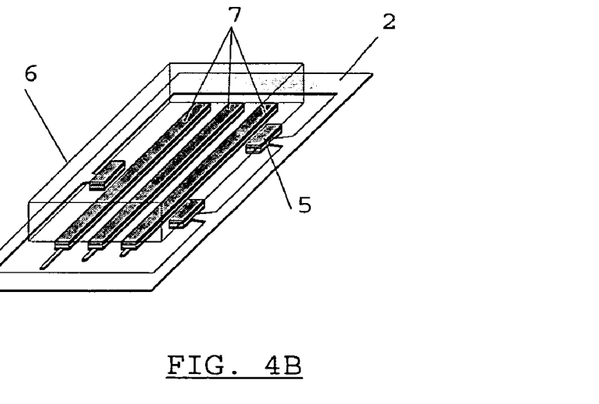
FIG. 4B represents in perspective view the probe configuration of FIG. 4A.

FIGS. 3A–B and 4A–B show other embodiments. In FIGS. 3A–B, a probe configuration comprising three probe tips is attached to one holder 6. Three bonding pads 7 are connected to the respective cantilevers 4, while three separate bonding pads 5 are present, connected to the substrate by breakable strips 13. FIGS. 4A–B show a probe structure wherein the bonding pads 7 which are in connection with a probe cantilever and tip stretch over the full length of the contact region. Besides these, there are three small pads 5, connected to the probe layer by strips 13. The release chemical must flow into the long channels between the pads 7 in order to underetch the pads from the side.

Figure 5A:
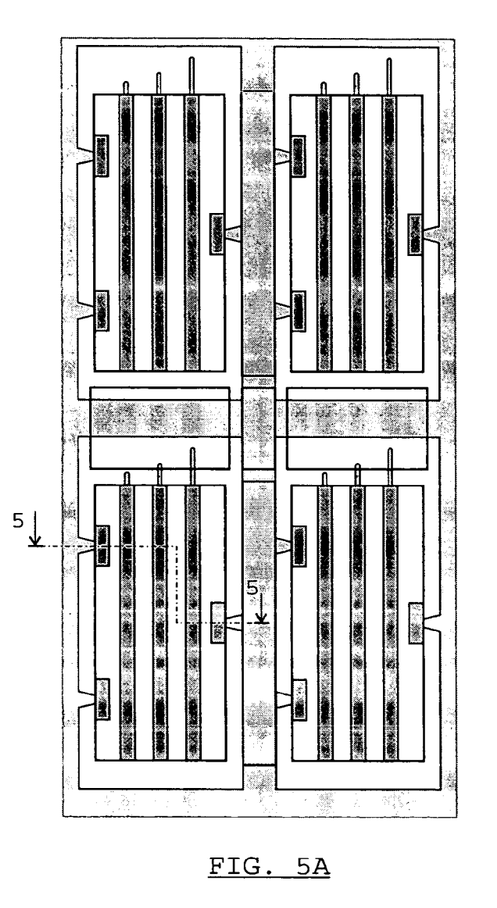
FIG. 5A represents in top view a plurality of probe configurations formed on a substrate, wherein the holder substrate may be diced after attachment.
Figure 5B:
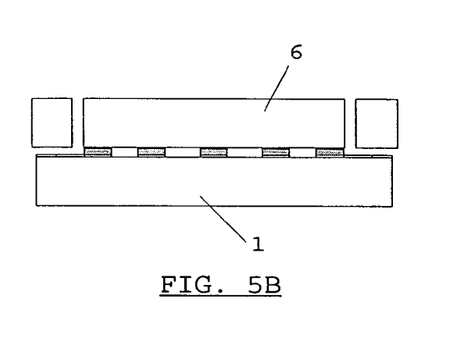
FIG. 5B represents a sectioned view of the structure of FIG. 5A taken along line 5—5.

According to one embodiment, the holders are not individually bonded to the probes. A full wafer is preferably bonded on top of a substrate whereon a plurality of probe configurations has been created. As shown in FIGS. 5A–B, this wafer is then diced to form individual holders before release.

Figure 6A:
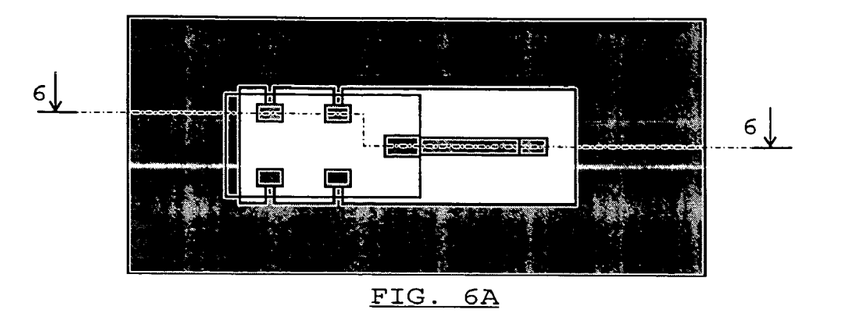
FIG. 6A represents in top view one embodiment of a probe configuration.
Figure 6B:
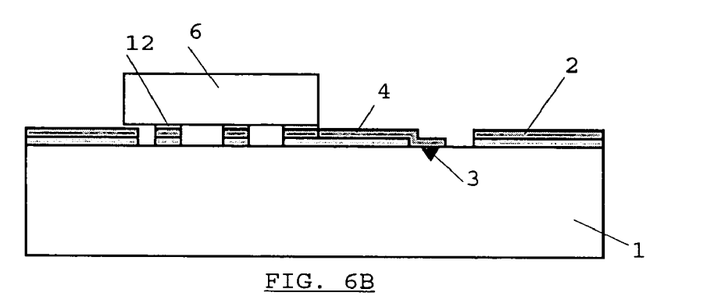
FIG. 6B represents a sectioned view of the probe configuration of FIG. 6A taken along line 6—6, wherein the sacrificial layer has been pre-etched prior to holder attachment.
Figure 6C:
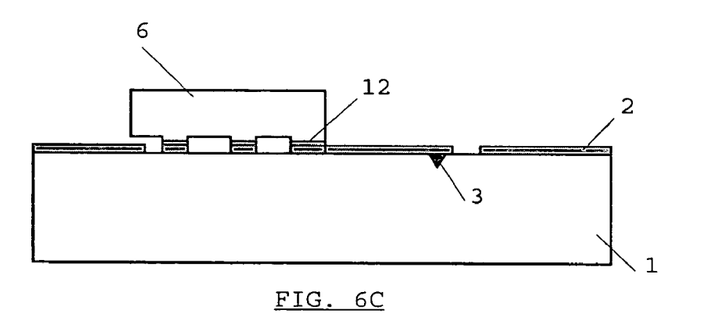
FIG. 6C represents a sectioned view of the probe configuration of FIG. 6A taken along line 6—6, wherein the holder has been pre-etched.
Figure 6D:
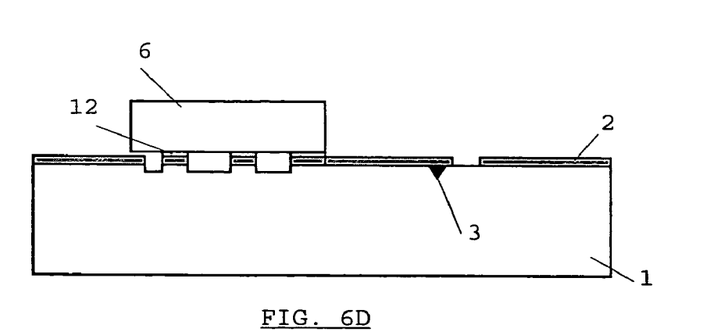
FIG. 6D represents a sectioned view of the probe configuration of FIG. 6A taken along line 6—6, wherein the substrate has been pre-etched.

During release, the release chemical must flow between the gap formed between the substrate surface and the holder. Depending on the configuration, the height of this gap is either determined by the thickness of the bond 12 or the combined thickness of the bond 12 and the probe layer 2. FIG. 6B shows an embodiment wherein a pre-etching of the sacrificial layer 10 is performed, prior to the holder attachment. FIG. 6C shows an embodiment wherein a pre-etch of the holder is performed, while FIG. 6D shows an embodiment involving a pre-etch of the substrate. All embodiments of FIGS. 6A to 6D are aimed at increasing the gap between the substrate surface and the holder, in order to facilitate the flow of release chemical into this gap.

Figure 7A:
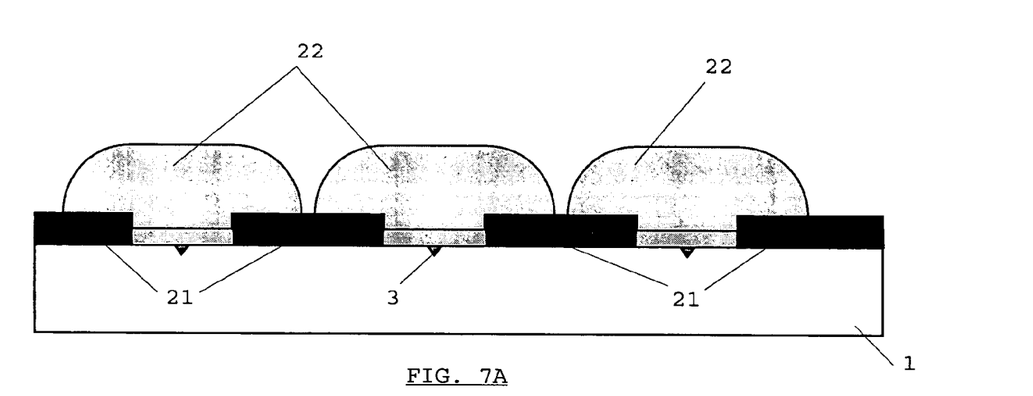
FIG. 7A represents a sectioned view of a probe configuration structure for formation of a holder by plating.
Figure 7B:
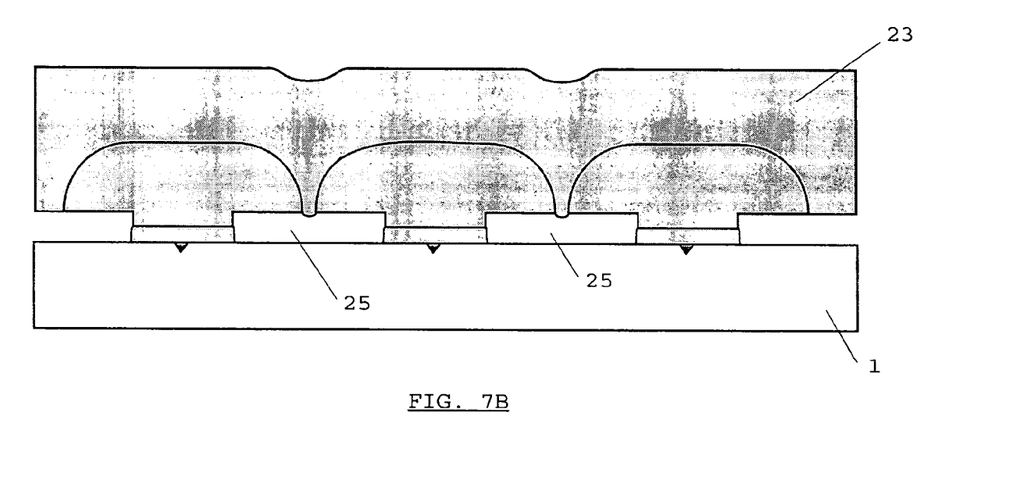
FIG. 7B represents a sectioned view of the probe configuration structure of FIG. 7A with a plated holder.

Embodiments of the invention are equally related to other ways of producing AFM probes by releasing from the front side, after holder attachment. One embodiment in this respect is shown in FIGS. 7A–B, and involves the creation of holders by plating. The probe layer comprising the tip 3 and cantilever 4 is prepared as in the previous embodiments. In this case, the probe layer is patterned for a number of probes simultaneously so that it contains a number of long parallel pads separated by gaps, similar to the pattern shown in FIGS. 4A–B. However, the holder is not attached onto the pads, but a thick resist layer is applied on top of the probe configuration, and patterned so that areas 21 of resist remain in the gaps. The holder is then created by plating, for example a layer of Ni 22, on top of the probe configurations. The plating process is continued until the resist-filled gaps are almost sealed off, as shown in FIG. 7B. At this point, the resist is removed, leaving the gaps empty to create channels 25, and the plating is continued until a holder layer 23 is obtained. The channels allow the underetching of the probe configuration to take place in the above described way, by release chemical flowing into the channels and underetching the pads from the side.

Figure 8A:
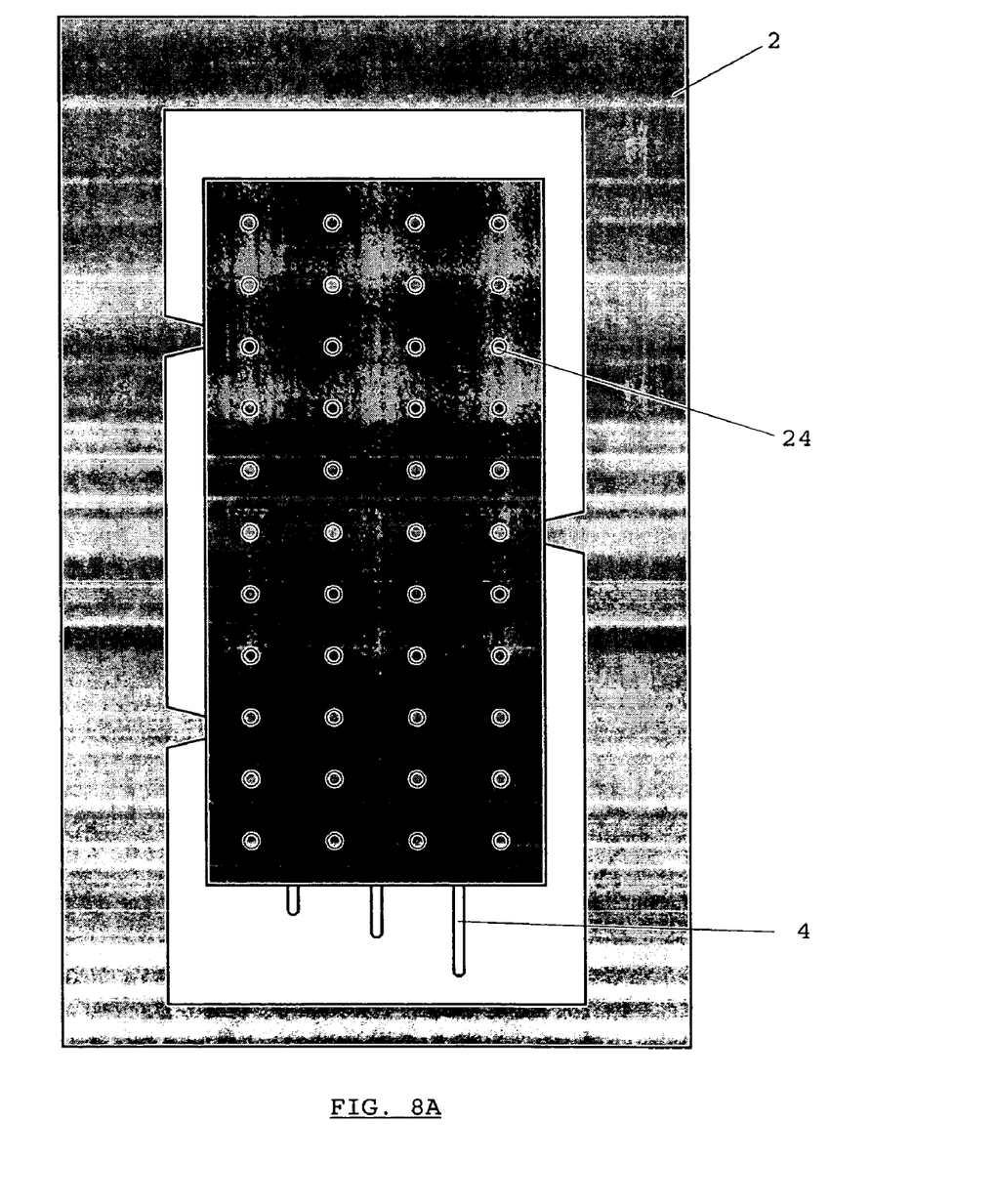
FIG. 8A represents in top view another embodiment of a probe configuration comprising a holder with holes through the thickness.
Figure 8B:
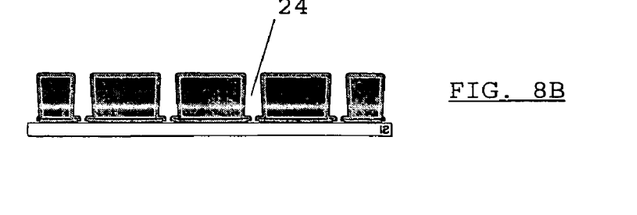
FIG. 8B represents a sectioned view of the probe configuration of FIG. 8A

Another embodiment of the invention makes use of a holder or holder substrate comprising holes 24 through the thickness (see FIGS. 8A–B), bonded or formed in another way including plating, or thick resist patterning to a probe layer which is not necessarily patterned to comprise bonding pads, but which is patterned to have openings aligned with the holes in the holder. These openings equally have the effect of reducing the surface of the contact region so that this contact region is smaller than the surface area of the holder region which is to be attached to the contact region. The holes allow the flow of release chemical to the contact region between the holder and the probe configuration and consequently between the probe configuration and the sacrificial layer or the Si substrate, so that the contact region can be underetched and a release from the front side becomes possible.

Preferably, the total contact region between the probe and the substrate after bonding is less than 0.5 mm$^2$. However, it has been found that the method works well even with larger bonding pads, for example those shown in FIGS. 4A–B, even if very narrow channels are left. The substrate is preferably monocrystalline, preferably <100>, silicon.

The probe configuration may be created by applying a probe layer, for example a silicon nitride layer or a metal layer, and subsequently patterning this layer by known lithography techniques. The probe layer may also consist of silicon oxide, a plastic including SU-8 or a hardmetal.

Alternatively, the probe configuration may be obtained by a plating technique, by plating onto a previously patterned seed layer, or wherein a patterning step is performed on a resist layer, before plating the probe configuration selectively in the regions where there is no resist, and thereafter removing the resist. Another way is the damascene process, wherein the probe layer is plated onto a previously patterned resist layer, and subsequently polished, whereafter the resist is removed.

According to a specific embodiment of the invention, the probe layer can also be formed by implanting or diffusing impurities such as a dopant (such as boron) or another element such as carbon. Such a layer is etched more slowly (about 10 times for highly boron doped Si) in KOH than undoped Si. The Cantilever will then be patterned into the Si wafer (bulk micromachining). Such a probe layer would be underetched the same way as a deposited layer.

The holder may be silicon or glass in the case of a separately attached holder or holder substrate. For a holder applied by plating, Ni may be used, as described above in relation to FIGS. 7A–B. If a photosensitive polymer (resist) is used, photosensitive epoxy (SU-8) is preferred. The holder may be active, meaning that it may incorporate active devices such as transistors.

The holder may be attached by solder bonding including SnPb, Sn, Ag, SnAg, SnCu, SnBi. It may be done using adhesive bonding including Epoxy (SU-8), Polyimide, BCB, anodic bonding or eutectic bonding. A holder may equally be created by spinning and patterning a thick resist layer.

According to one embodiment, the shape of the bonding pads is such that no point on these pads is further than about 300 μm away from the edge of the pad.

As a sacrificial layer the following can be used: silicon, porous silicon, Germanium, silicon oxide, Al, Ti, polymer, or others.

The underetching of the silicon substrate itself (FIG. 1C) may be performed using an anisotropic etchant, such as KOH, TMAH, NaOH, NH$_4$OH, RbOH, CsOH, LiOH, ethylenediamine (EDP). The probe is preferably rotated with respect to the wafer north-south direction, and aligned with a <100> direction of the Si-substrate. The patterns may be aligned with the <100> direction while the probe is oriented in another direction.

Direct isotropic etching of the silicon substrate may be done by using an etchant based on nitric acid or HCl or other.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A method of producing probes for atomic force microscopy, comprising:

producing, on a surface of one side of a semiconductor substrate, one or more moulds for the production of one or more probe tips;

producing, on the one side, one or more probe configurations, wherein each configuration comprises a contact region for attachment of a holder, and at least one set of a probe tip and a cantilever wherein at least a portion of the contact region is separate from the probe tip and the cantilever;

attaching one or more holders to the contact region(s), wherein the surface area of each contact region is smaller in size than the surface area of the holder which is to be attached to the contact region; and releasing the structure comprising the probe configuration and the holder from the substrate by under-etching the probe configuration from the one side of the substrate on which the probe configuration is produced, wherein under-etching is performed after attaching the holder.

2. The method according to claim 1, wherein the contact region comprises one or more bonding pads, wherein the total surface area of the pads is smaller in size than the surface area of the holder which is to be attached to the pads.

3. The method according to claim 2, wherein the pads are elongated and channels are formed between neighbouring pads.

4. The method according to claim 1, wherein the holder comprises a plurality of holes configured to allow release chemical to reach the contact region, and wherein the contact region comprises a number of openings, which are aligned with the holes allowing under-etching of the probe configuration.

5. The method according to claim 1, wherein attaching the one or more holders takes place by bonding, and wherein the method further comprises applying a bonding layer to at least one of the contact region and the holder, prior to attaching the holder.

6. The method of claim 5, wherein the combined height of the contact region and the bonding layer is sufficient to create a gap between the holder and the substrate, so as to allow release chemical to flow between the holder and the substrate.

7. The method according to claim 1, wherein the height of the contact region is sufficient to create a gap between the holder and the substrate, so as to allow release chemical to flow between the holder and the substrate.

8. The method of claim 1, further comprising applying a sacrificial layer to the substrate prior to producing the probe configuration.

9. The method of claim 1, wherein the holder is attached through the attachment of a holder substrate to a substrate comprising a plurality of probe configurations, and wherein the holder substrate is diced to form individual holders, the dicing step taking place before the releasing the holders.

10. The method according to claim 1, wherein the under-etching of the probe configuration is performed from only the one side of the substrate on which the probe configuration is produced.

11. A method of manufacturing a probe for atomic force microscopy, comprising:

forming one or more moulds on a surface of one side of a semiconductor substrate, wherein the moulds are configured for formation of one or more probe tips;

forming one or more probe configurations on the one side of the semiconductor substrate, wherein each configuration comprises a contact region and at least one set of a probe tip and a cantilever;

attaching one or more holders to the contact region(s), wherein a surface area of each contact region is smaller than a surface area of the holder which is attached to the contact region; and releasing the probe configuration and the attached holder from the substrate by under-etching the probe configuration from only the one side of the substrate on which the probe configuration is formed.

* * * * *